United States Patent
Fazeli et al.

(10) Patent No.: US 11,841,292 B2
(45) Date of Patent: Dec. 12, 2023

(54) SHOCK STRUT SERVICE MONITORING USING SENSORS AND PHYSICAL STRUT MEASUREMENT

(71) Applicant: GOODRICH CORPORATION, Charlotte, NC (US)

(72) Inventors: Amir Fazeli, Mississauga (CA); Adnan Cepic, Mississauga (CA); Susanne M Reber, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 18/097,225

(22) Filed: Jan. 14, 2023

(65) Prior Publication Data
US 2023/0160781 A1    May 25, 2023

Related U.S. Application Data

(62) Division of application No. 16/267,555, filed on Feb. 5, 2019, now Pat. No. 11,579,047.

(51) Int. Cl.
*G01M 17/04* (2006.01)
*B64F 5/60* (2017.01)
(Continued)

(52) U.S. Cl.
CPC ............. *G01M 17/04* (2013.01); *B64C 25/60* (2013.01); *B64F 5/60* (2017.01); *F16F 9/3292* (2013.01);
(Continued)

(58) Field of Classification Search
CPC .......... G01M 17/04; B64C 25/60; B64F 5/60; F16F 9/3292; F16F 2228/002; F16F 2228/004

See application file for complete search history.

(56) References Cited

U.S. PATENT DOCUMENTS

| 2012/0053783 | A1  | 3/2012 | Nance |
| 2015/0094982 | A1* | 4/2015 | Dupont De Dinechin .................. G01G 19/414 702/175 |

(Continued)

FOREIGN PATENT DOCUMENTS

| EP | 2921404 | 9/2015 |
| EP | 3299792 | 3/2018 |
| EP | 3424815 | 1/2019 |

OTHER PUBLICATIONS

European Patent Office, European Search Report dated Jun. 23, 2020 in Application No. 19215313.8.
(Continued)

*Primary Examiner* — Yuen Wong
(74) *Attorney, Agent, or Firm* — SNELL & WILMER L.L.P.

(57) ABSTRACT

A method for monitoring a shock strut may comprise measuring a first shock strut pressure, measuring an ambient temperature, measuring a shock strut stroke, measuring a second shock strut pressure, and determining a servicing condition of the shock strut based upon the first shock strut pressure, the ambient temperature, the shock strut stroke, and the second shock strut pressure, wherein the servicing condition indicates whether it is desirable for the shock strut to be serviced with at least one of a liquid and a gas. The first shock strut pressure and the shock strut stroke may be measured before the takeoff event with a weight of an aircraft supported by the shock strut.

7 Claims, 6 Drawing Sheets

(51) Int. Cl.
  *B64C 25/60*         (2006.01)
  *F16F 9/32*          (2006.01)
(52) U.S. Cl.
  CPC ... *F16F 2228/002* (2013.01); *F16F 2228/004* (2013.01)

(56) References Cited

U.S. PATENT DOCUMENTS

2015/0267769 A1     9/2015   Fazeli et al.
2018/0058985 A1*    3/2018   Luce ................ B64D 45/00

OTHER PUBLICATIONS

European Patent Office; European Office Action dated May 3, 2022 in Application No. 19215313.8.
USPTO; Requirement for Restriction dated Apr. 15, 2022 in U.S. Appl. No. 16/267,555.
USPTO; Non-Final Office Action dated Jul. 22, 2022 in U.S. Appl. No. 16/267,555.
USPTO; Notice of Allowance dated Oct. 18, 2022 in U.S. Appl. No. 16/267,555.
European Patent Office; European Office Action dated Nov. 22, 2022 in Application No. 19215313.8.

* cited by examiner

SHOCK STRUT SERVICE MONITORING USING SENSORS AND PHYSICAL STRUT MEASUREMENT

CROSS REFERENCE TO RELATED APPLICATIONS

This application is a divisional of, and claims priority to, and the benefit of U.S. patent application Ser. No. 16/267,555, filed on Feb. 5, 2019, and entitled "SHOCK STRUT SERVICE MONITORING USING SENSORS AND PHYSICAL STRUT MEASUREMENT" which is incorporated by reference herein in its entirety.

FIELD

The present disclosure relates to landing gear, and more particularly, to methods for servicing and monitoring shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Functionality and performance of a landing gear shock strut depends on internal gas and oil levels. Gas pressure and oil volume may be maintained within a design envelope to ensure that the landing gear functionality is within an acceptable range.

SUMMARY

A method for monitoring a shock strut is disclosed, comprising measuring a first shock strut pressure, measuring an ambient temperature, measuring a shock strut stroke, measuring a second shock strut pressure, and determining a servicing condition of the shock strut based upon the first shock strut pressure, the ambient temperature, the shock strut stroke, and the second shock strut pressure, wherein the servicing condition indicates whether it is desirable for the shock strut to be serviced with at least one of a liquid and a gas, the first shock strut pressure and the shock strut stroke are measured before a takeoff event, and the second shock strut pressure is measured after the takeoff event.

In various embodiments, the servicing condition is determined further based upon a second shock strut temperature, wherein the second shock strut temperature is assumed to be equal to the ambient temperature.

In various embodiments, the first shock strut pressure and the shock strut stroke are measured before the takeoff event with a weight of an aircraft supported by the shock strut.

In various embodiments, the ambient temperature is measured under a weight on wheels (WONW) condition before the takeoff event, the first strut pressure is measured under the WONW condition, the shock strut stroke is measured under the WONW condition, and the second strut pressure is measured under a weight off wheels (WOFFW) condition after the takeoff event.

In various embodiments, the first strut pressure is measured under a weight on wheels (WONW) condition before the takeoff event, the shock strut stroke is measured under the WONW condition, the ambient temperature is measured under a weight off wheels (WOFFW) condition after the takeoff event, and the second strut pressure is measured under the WOFFW condition.

In various embodiments, the ambient temperature is measured using a temperature sensor located externally from the shock strut.

In various embodiments, the temperature sensor is mounted to at least one of a wing, a fuselage, or a landing gear bay of an aircraft.

In various embodiments, the servicing condition of the shock strut is determined using a reference curve corresponding to the ambient temperature.

A method for monitoring a shock strut is disclosed, comprising calculating a servicing condition of the shock strut based upon a first shock strut pressure, an ambient temperature, a shock strut stroke, and a second shock strut pressure, wherein the first shock strut pressure and the shock strut stroke are measured at a first time, and the second shock strut pressure is measured at a second time, wherein the shock strut servicing condition indicates whether it is desirable for the shock strut to be serviced with at least one of a liquid and a gas.

In various embodiments, the first time is before a takeoff event with the shock strut in a partially compressed position, and the second time is after the takeoff event during a flight of an aircraft.

In various embodiments, the ambient temperature is measured before the takeoff event.

In various embodiments, the ambient temperature is measured after the takeoff event.

In various embodiments, the ambient temperature is measured using a temperature sensor located externally from the shock strut.

In various embodiments, the temperature sensor is mounted to at least one of a wing, a fuselage, or a landing gear bay of an aircraft.

In various embodiments, the servicing condition of the shock strut is determined using a reference curve corresponding to the ambient temperature.

In various embodiments, the calculating comprises calculating a first number of moles of gas dissolved in a fluid, and calculating a second number of moles of gas dissolved in the fluid.

In various embodiments, the calculating the first number of moles of gas dissolved in the fluid is calculated as $n_v^a = C(\hat{T}^a) \times \hat{P}^a$, where $n_v^a$ is the first number of moles of gas dissolved in the fluid corresponding to the first time, $C(\hat{T}^a)$ is a Henry's factor as a function of the ambient temperature, and $\hat{P}^a$ is the first shock strut pressure.

A shock strut monitoring system is disclosed, comprising a controller, and a tangible, non-transitory memory configured to communicate with the controller, the tangible, non-transitory memory having instructions stored thereon that, in response to execution by the controller, cause the controller to perform operations comprising receiving, by the controller, a first shock strut pressure, an ambient temperature, a shock strut stroke, and a second shock strut pressure, wherein the first shock strut pressure and the shock strut stroke are received at a first time, and the second shock strut pressure is received at a second time, and calculating, by the controller, a shock strut servicing condition, wherein the shock strut servicing condition indicates whether it is desirable for the shock strut to be serviced with at least one of a liquid and a gas.

In various embodiments, the first time is while an aircraft is on a ground and before a takeoff event and the second time is while the aircraft is off the ground and after the takeoff event.

In various embodiments, the operations further comprise sending, by the controller, the shock strut servicing condition to a display.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
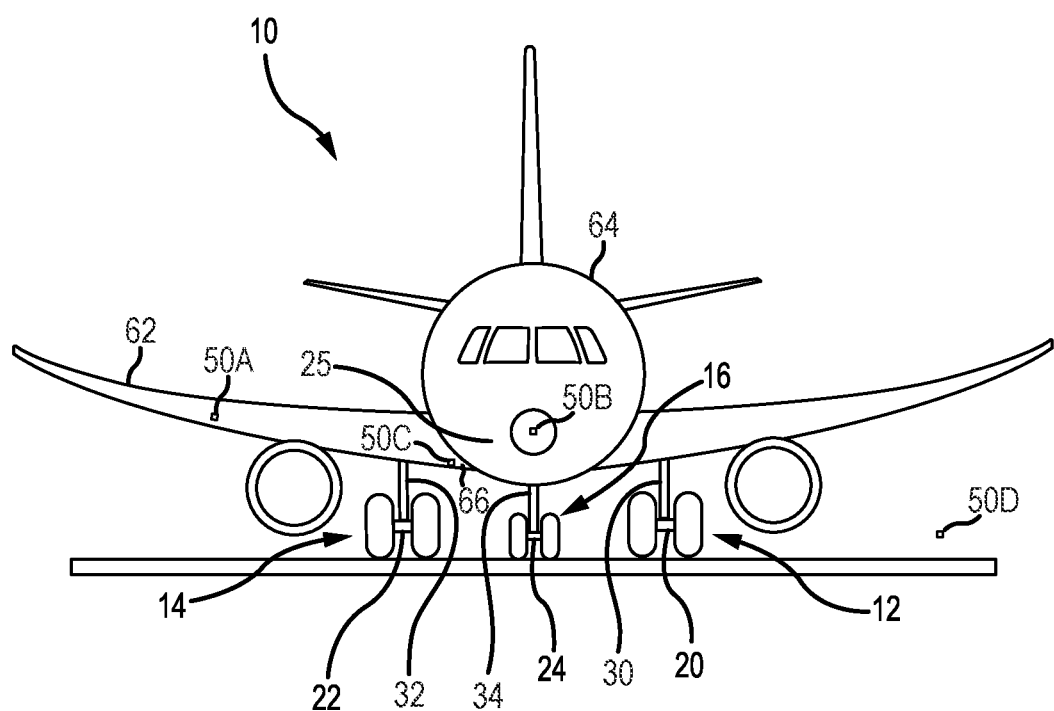
FIG. 1 illustrates an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Aircraft landing gear systems in accordance with the present disclosure may comprise a shock strut. A shock strut may comprise various fluids such as oil and gas. Performance of the shock strut may be evaluated by monitoring aspects of the shock strut, including gas temperature, gas pressure, and shock strut stroke of the shock strut under various conditions of the shock strut and aircraft. Shock strut stroke may refer to a shock strut piston position.

Gas curves used as springs in aircraft landing gear are typically calculated based upon a static test, where the shock strut is slowly compressed and decompressed, causing the pressure of the gas to slowly change in a manner to allow heat dissipation during the process. However, during operation of a vehicle, such as an aircraft for example, the shock strut may rapidly stroke causing rapid pressure changes in the gas, such as nitrogen for example, and allowing the gas to more freely move into and out a fluid, such as oil for example. During these rapid pressure changes (caused by stroking the shock absorber quickly), the oil constantly remains saturated with nitrogen. In contrast, when slowly changing the pressure during a static test, the nitrogen is not as free to go into and out the oil and therefore can leave the oil & nitrogen in an un-balanced state; either over-saturated or under-saturated. Traditionally measured gas curves start at the fully extended position and stroke to the fully compressed condition and then back to the fully extended position. Assuming the gas and oil are at balance (oil fully saturated) at the start, as the strut is compressed and pressure increased, the oil becomes more under saturated as the higher pressure drives more nitrogen into solution, but the slow change prevents it. Systems and methods disclosed herein, take into account gas absorption and desorption in the fluid (e.g., gas entrainment within the fluid) resulting in more accurate measurements of shock strut servicing conditions, such as gas volume and oil volume. Systems and methods disclosed herein may accurately calculate a shock strut servicing condition, taking into account gas absorption and desorption in the fluid, without the need for a position sensor.

Systems and methods disclosed herein may utilize a temperature sensor located externally from the shock strut. For example, an existing temperature sensor on an aircraft may be utilized under the assumption that the temperature of the ambient air at the location of the existing temperature sensor represents the temperature of the gas inside of the shock strut.

The following nomenclature in table 1 corresponds to various equations and parameters described in the present disclosure:

TABLE 1

Nomenclature for equations 1-6
Nomenclature

| | |
|---|---|
| $V_{tot}$ | Total internal volume of the shock strut in the fully extended position |
| A | Piston area |
| a | Represents sensor readings and shock strut state after takeoff |
| b | Represents sensor readings and shock strut state before takeoff |
| $V_{gas}^{a}$ | Gas volume in state "a" (Unknown parameter 1) |
| $V_{gas}^{b}$ | Gas volume in state "b" (Unknown parameter 2) |
| $V_{oil}^{a}$ | Oil volume in state "a" (Unknown parameter 3) |
| $V_{oil}^{b}$ | Oil volume in state "b" (Unknown parameter 4) |
| $n_{v}^{a}$ | Number of moles of gas dissolved in oil in state "a" per unit volume of oil (Unknown parameter 5) (also referred to herein as a first number of moles of gas) |

TABLE 1-continued

Nomenclature for equations 1-6
Nomenclature

| | |
|---|---|
| $n_v^b$ | Number of moles of gas dissolved in oil in state "b" per unit volume of oil (Unknown parameter 6) (also referred to herein as a second number of moles of gas) |
| $S^b$ | Shock strut stroke in state "b" per unit volume of oil |
| $\hat{T}^a$ | Measured temperature in state "a" (also referred to herein as a second shock strut temperature or an ambient temperature) |
| $\hat{T}^b$ | Measured temperature in state "b" (also referred to herein as a first shock strut temperature or an ambient temperature) |
| $\hat{p}^a$ | Measured pressure in state "a" (also referred to herein as a second shock strut pressure) |
| $\hat{p}^b$ | Measured pressure in state "b" (also referred to herein as a first shock strut pressure) |
| C(T) | Henry's factor as a function of temperature |
| α | Oil thermal expansion coefficient |
| R | Universal Gas Constant |

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include shock strut 30 and wheel assembly 20. Landing gear 14 may include shock strut 32 and wheel assembly 22. Landing gear 16 may include shock strut 34 and nose wheel assembly 24. Aircraft 10 may comprise a controller 25. Landing gear 14 may be in communication with controller 25 and may send information to controller 25, for example, shock strut pressure and temperature information.

In various embodiments, controller 25 may comprise one or more processors. Controller 25 may comprise hardware having a tangible, non-transitory memory configured to communicate with controller 25 and having instructions stored thereon that cause controller 25 to perform various operations as described herein (e.g., method 400 and method 500).

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 2:
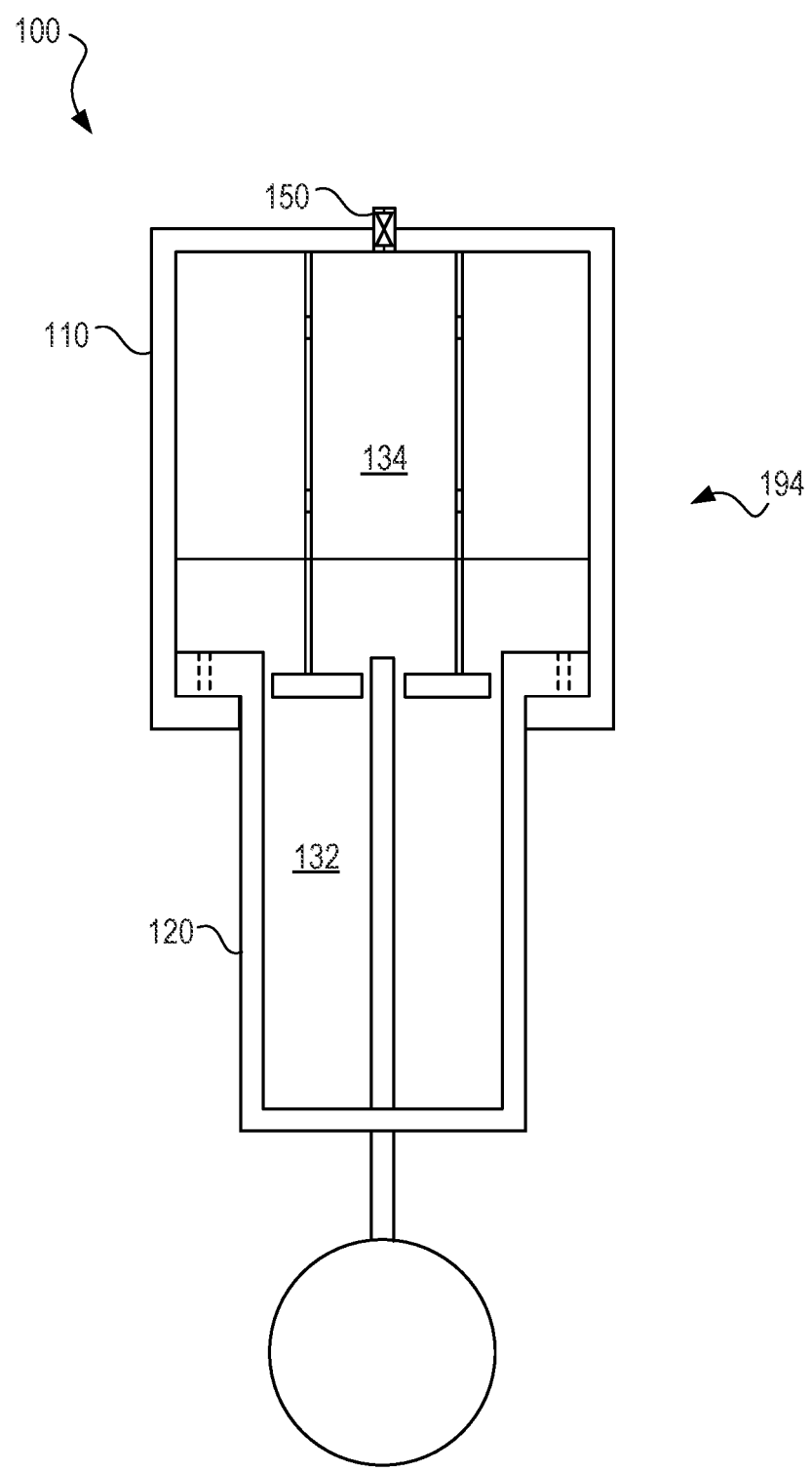
FIG. 2 illustrates a schematic view of a shock strut in a fully extended position, in accordance with various embodiments.

With reference to FIG. 2, a shock strut 100 is illustrated, in accordance with various embodiments. Shock strut 32 of FIG. 1 may be similar to shock strut 100. Shock strut 100 may comprise a strut cylinder 110 and a strut piston 120. Strut piston 120 may be operatively coupled to strut cylinder 110 as described herein. Strut cylinder 110 may be configured to receive strut piston 120 in a manner that allows the two components to telescope together and absorb and dampen forces transmitted thereto. In various embodiments, a liquid 132, such as a hydraulic fluid and/or oil may be located within strut cylinder 110. Further, a gas 134, such as nitrogen or air, may be located within strut cylinder 110. Strut cylinder 110 and strut piston 120 may, for example, be configured to seal such that fluid contained within strut cylinder 110 is prevented from leaking as strut piston 120 translates relative to strut cylinder 110.

In various embodiments, shock strut 100 may be installed onto a landing gear of an aircraft. FIG. 2 illustrates shock strut 100 in a fully extended position 194, such as when an aircraft is in flight for example. Various parameters measured and/or calculated herein that correspond to fully extended position 194 may be referred to herein with a superscript "a" (e.g., see step 440 of FIG. 4). Said parameters may be measured after a takeoff event and during flight of an aircraft. Said parameters may be measured within a pre-determined duration of a takeoff event of the aircraft, such as within minutes of the takeoff event for example. For example, a controller (e.g., controller 25 of FIG. 1) may determine that an aircraft has taken off from the ground by monitoring the pressure within shock strut 100. During a takeoff event, shock strut 100 may be extended wherein strut piston 120 translates with respect to strut cylinder 110. The pressure of liquid 132 and gas 134 may decrease in response to shock strut 100 being extended.

In various embodiments, a pressure sensor 150 may be installed on shock strut 100. Pressure sensor 150 may be configured to measure the pressure of gas 134. A separate temperature sensor may be located in proximity to shock strut 100. Stated differently, the temperature of gas 134 may be measured indirectly. For example, with reference to FIG. 1, a temperature sensor 50A may be mounted on a wing 62 of aircraft 10, in accordance with various embodiments. In various embodiments, a temperature sensor 50B may be mounted on a fuselage 64 of aircraft 10. In various embodiments, a temperature sensor 50C may be mounted in a landing gear bay 66 of aircraft 10. The temperature of gas 134 may be determined by measuring the temperature at temperature sensor 50A, temperature sensor 50B, or temperature sensor 50C. In various embodiments, temperature sensor 50A, temperature sensor 50B, and/or temperature sensor 50C may measure ambient air temperature. Temperature sensor 50A, temperature sensor 50B, and/or temperature sensor 50C may comprise any suitable sensor for measuring temperature such as a negative temperature coefficient (NTC) thermistor, a resistance temperature detector (RTD), a thermocouple, and a semiconductor-based sensor, for example. In various embodiments, temperature sensor 50A, temperature sensor 50B, and/or temperature sensor 50C comprise a pitot tube. In this regard, systems and methods as disclosed herein may operate under the assumption that the temperature of gas 134 is equal to the ambient temperature at temperature sensor 50A, temperature sensor 50B, and/or temperature sensor 50C. In various embodiments, controller 25 may receive a temperature signal from temperature sensor 50A, temperature sensor 50B, and/or temperature sensor 50C for determining a servicing condition of shock strut 30, shock strut 32, and/or shock strut 34.

Although described herein as a pressure sensor 150, it is contemplated herein that an integrated temperature/pressure sensor may be used in place of pressure sensor 150. In this regard, temperature of gas 134 may be measured directly instead of measuring ambient temperature.

Figure 3:
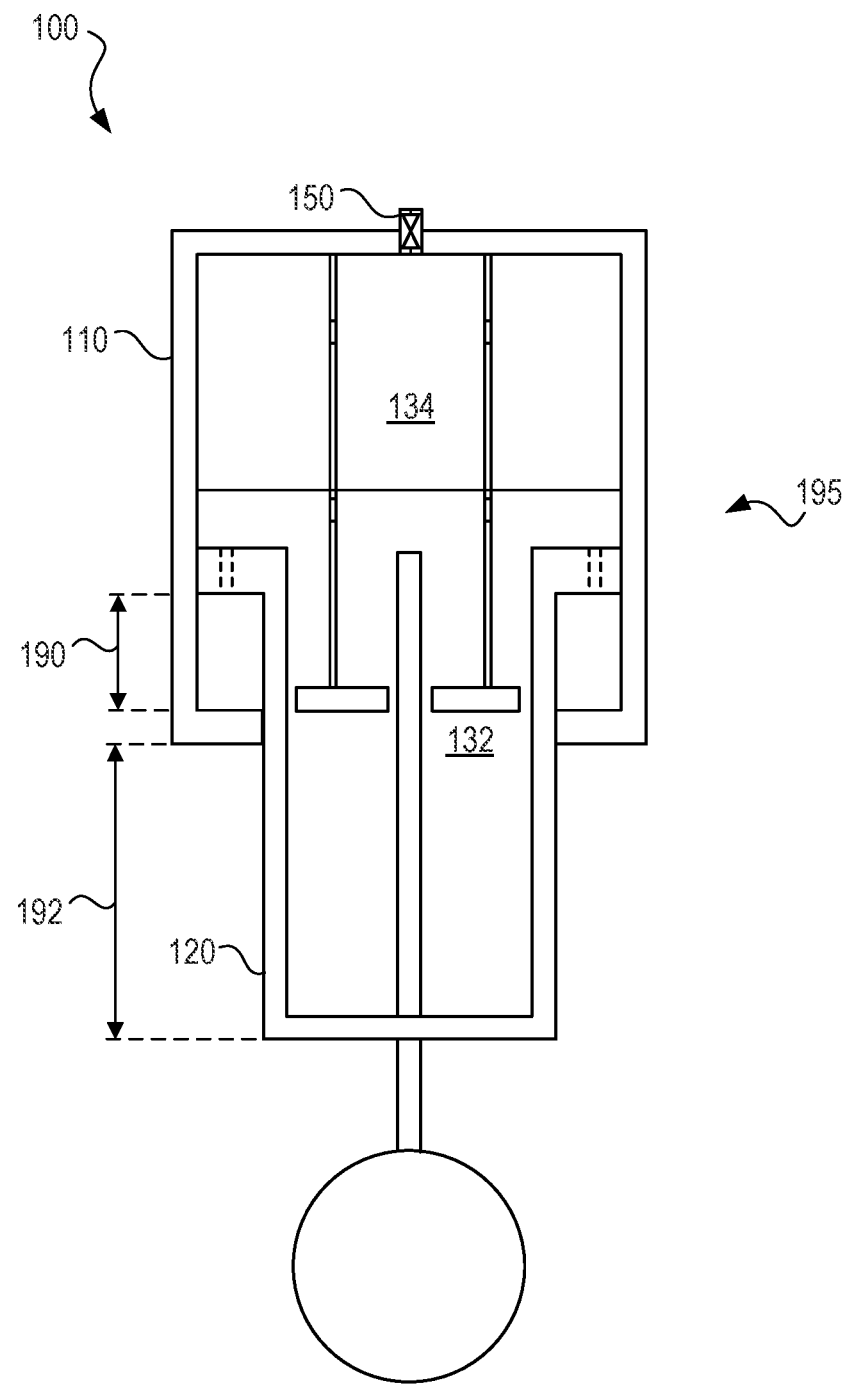
FIG. 3 illustrates a schematic view of the shock strut of FIG. 2 in a partially compressed position corresponding to an aircraft in a static condition, in accordance with various embodiments.

With reference to FIG. 3, shock strut 100 is illustrated in a partially compressed position (also referred to herein as a compressed position) 195. Shock strut 100 may compress in a weight on wheels (WONW) condition, such as when an aircraft is supported by its wheels on the ground. In various embodiments, compressed position 195 may be a static position when an aircraft is supported on the ground by shock strut 100. In various embodiments, various parameters measured and/or calculated herein that correspond to compressed position 195 may be referred to herein with a superscript "b" (e.g., step 410, step 420, and step 430 of FIG. 4). Said parameters may be measured within a pre-determined duration before a takeoff event of an aircraft, such as within minutes before the aircraft takes off from the ground. The position of strut piston 120 relative to strut cylinder 110 may be measured as shock strut stroke 190. Shock strut stroke 190 may correspond to a distance that strut piston 120 has moved relative to the fully extended position 194 (see FIG. 2) relative to strut cylinder 110. Shock strut stroke 190 may be measured directly or indirectly. For example, shock strut stroke 190 may be indirectly measured by measuring a shock strut extension 192. Shock strut stroke 190 may be manually measured using a tool, such as a ruler for example.

Figure 4:
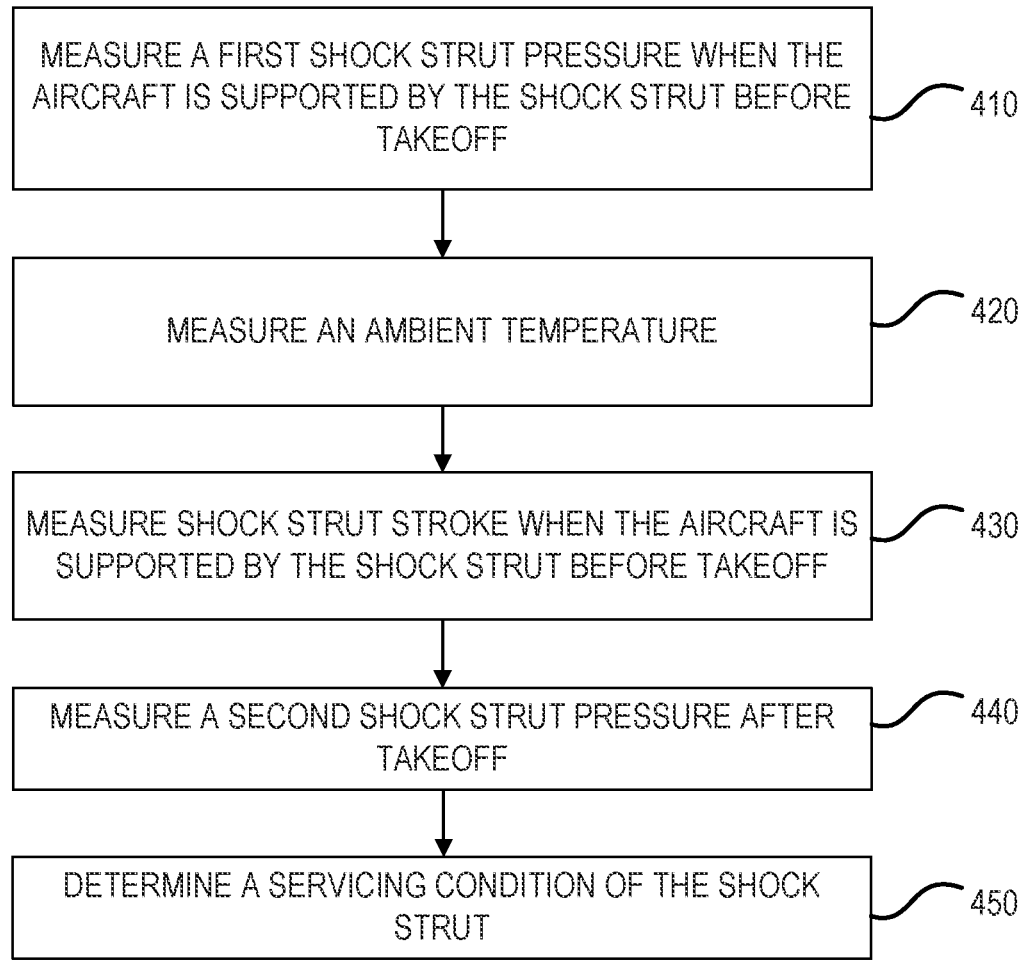
FIG. 4 and FIG. 5 illustrate methods for monitoring a shock strut utilizing a set of six equations with six unknown values, in accordance with various embodiments.

With reference to FIG. 4, a method 400 for monitoring a shock strut for determining a servicing condition is provided, in accordance with various embodiments. As used herein, the term "servicing condition" may refer to an oil volume within a shock strut, a gas pressure within the shock strut, and/or a gas volume within the shock strut. The servicing condition may indicate whether it is desirable to service the shock strut.

Method 400 includes measuring a first shock strut pressure when the aircraft is supported by the shock strut before takeoff (step 410). With combined reference to FIG. 3 and FIG. 4, step 410 may include measuring the pressure of gas 134 within shock strut 100 under WONW conditions. In various embodiments, step 410 may include measuring, by a first sensor (e.g., pressure sensor 150), the pressure of gas 134 in shock strut 100. Method 400 includes measuring an ambient temperature (step 420). Step 420 may include measuring a temperature corresponding to the temperature of shock strut 100. In various embodiments, step 420 may include measuring, by a second sensor (e.g., temperature sensor 50A, temperature sensor 50B, or temperature sensor 50C), a temperature corresponding to the temperature of gas 134 in shock strut 100. In various embodiments, step 420 may include measuring, by offboard temperature sensor 50D, a temperature corresponding to the temperature of gas 134 in shock strut 100. For example, a use may measure an ambient temperature using an offboard temperature sensor 50D and input the measured ambient temperature manually into a computer system (e.g., controller 25), for example using a keyboard or the like. In various embodiments, with additional reference to FIG. 1, step 410 and step 420 may be performed while aircraft 10 is on the ground and before a takeoff event (also referred to herein as a first time) so that the measured ambient temperature corresponds to the measured pressure. In various embodiments, step 420 may be performed within a pre-determined duration after takeoff. The pre-determined duration may be short enough such that the temperature difference of gas 134, between the time that the pressure of gas 134 is measured and the time the temperature of gas 134 is measured, is insignificant. In various embodiments, the term "insignificant" as used herein refers to a temperature change of gas 134 of less than five degrees Fahrenheit (2.7775° C.). In various embodiments, the term "insignificant" as used herein refers to a temperature change of gas 134 of less than three degrees Fahrenheit (1.6665° C.).

Method 400 includes measuring a shock strut stroke when the aircraft is supported by the shock strut before takeoff (step 430). With combined reference to FIG. 3 and FIG. 4, step 430 may include measuring shock strut stroke 190. Shock strut stroke 190 may be measured directly or may be measured indirectly by measuring shock strut extension 192. In various embodiments, shock strut stroke 190 is measured manually. However, it is contemplated that shock strut stroke 190 may be measured by a position sensor installed on the shock strut. The shock strut stroke 190 may be provided to controller 25, with momentary reference to FIG. 1, using a user input device such as a keyboard or the like. In various embodiments, step 430 may be performed when shock strut 100 is in the compressed position 195. Shock strut stroke 190 may be measured while aircraft 10 is on the ground and before a takeoff event (also referred to herein as a first time) so that the measured shock strut stroke corresponds to the measured pressure of step 410 and the measured ambient temperature of step 420. When aircraft 10 is stationary, the temperature and pressure readings may comprise static temperatures and pressures.

Method 400 includes measuring a second shock strut pressure after takeoff (step 440). With combined reference to FIG. 2 and FIG. 4, step 440 may include measuring the pressure of gas 134 in shock strut 100 with shock strut 100 in the fully extended position 194. In various embodiments, step 440 may include measuring, by the first sensor (e.g., pressure sensor 150), the pressure of gas 134 in shock strut 100. Step 440 may be performed after a takeoff event (also referred to herein as a second time), such as after aircraft 10 has left the ground. A second temperature of gas 134, corresponding to the second shock strut pressure measured in step 440, may be assumed to be equal to the ambient temperature measured in step 420. Thus, step 440 may be performed within a predetermined duration of time after step 410, step 420, and step 430 such that the temperature of gas 134 is substantially equal during each of step 410, step 420, step 430, and step 440. In various embodiments, the predetermined duration may be less than one hour. In various embodiments, the predetermined duration may be less than thirty minutes. In various embodiments, the predetermined duration may be less than 10 minutes.

In various embodiments, step 410, step 420, and step 430 may be performed at substantially the same time, for example within minutes of each other. In various embodiments, step 440 may be performed after step 410, step 420, and step 430.

Method 400 includes determining a servicing condition of the shock strut (step 450). Step 450 may include determining the volume of liquid 132 within shock strut 100, the pressure of gas 134 within shock strut 100, the volume of gas 134 within shock strut 100, and/or the number of moles of gas 134 within shock strut 100. The servicing condition of shock strut 100 may be determined in accordance with various embodiments.

In various embodiments, the servicing condition of shock strut 100 may be determined by solving a set of equations as provided below with reference to equations 1 through 6. Equations 1 through 6 include six equations and six unknown values and thus may be solved as a set of equations.

$$V_{tot} = V_{gas}^a + V_{oil}^a \qquad \text{Eq. (1)}$$

$$n_v^a = C(\hat{T}^a) \times \hat{P}^a \qquad \text{Eq. (2)}$$

$$V_{tot} - AS^b = V_{gas}^b + V_{oil}^b \qquad \text{Eq. (3)}$$

$$V_{oil}^b = V_{oil}^a \times \left(1 + \alpha\left(\hat{T}^b - \hat{T}^a\right)\right) \qquad \text{Eq. (4)}$$

-continued $$n_v^b = C(\hat{T}^b) \times \hat{P}^b \quad \text{Eq. (5)}$$

$$\frac{\hat{P}^a V_{gas}^a}{R\hat{T}^a} = \frac{\hat{P}^b V_{gas}^b}{R\hat{T}^b} + V_{oil}^b \times n_v^b - V_{oil}^a \times n_v^a \quad \text{Eq. (6)}$$

In response to the temperature being measured in state 'a', $\hat{T}^b = \hat{T}^a$. In response to the temperature being measured in state 'b', $\hat{T}^a = \hat{T}^b$. In response to the temperature being measured in both in states 'a' and 'b', both measurements may be used in the equations above. Without being bound by theory, Henry's factor ($C(\hat{T})$) may be calculated based upon Henry's Law, which states that at a constant temperature, the amount of a gas that dissolves in a liquid is directly proportional to the partial pressure of that gas in equilibrium with that liquid. In various embodiments, in addition to pressure, Henry's factor ($C(\hat{T})$) is calculated as a function of temperature. In various embodiments, Henry's factor ($C(\hat{T})$) may be calculated using a pre-determined formula corresponding to the particular type of liquid 132 in shock strut 100. Calculating Henry's factor ($C(\hat{T})$) as a function of temperature may allow for a more accurate calculation of the servicing condition of shock strut 100. In this regard, the servicing condition of shock strut 100 may take into account absorption of gas 134 with liquid 132 and/or desorption of gas 134 with liquid 132.

In various embodiments, parameters such as piston area (A) and oil thermal expansion coefficient (α) may be known values stored in the tangible, non-transitory memory of controller 25, with momentary reference to FIG. 1.

Figure 5:
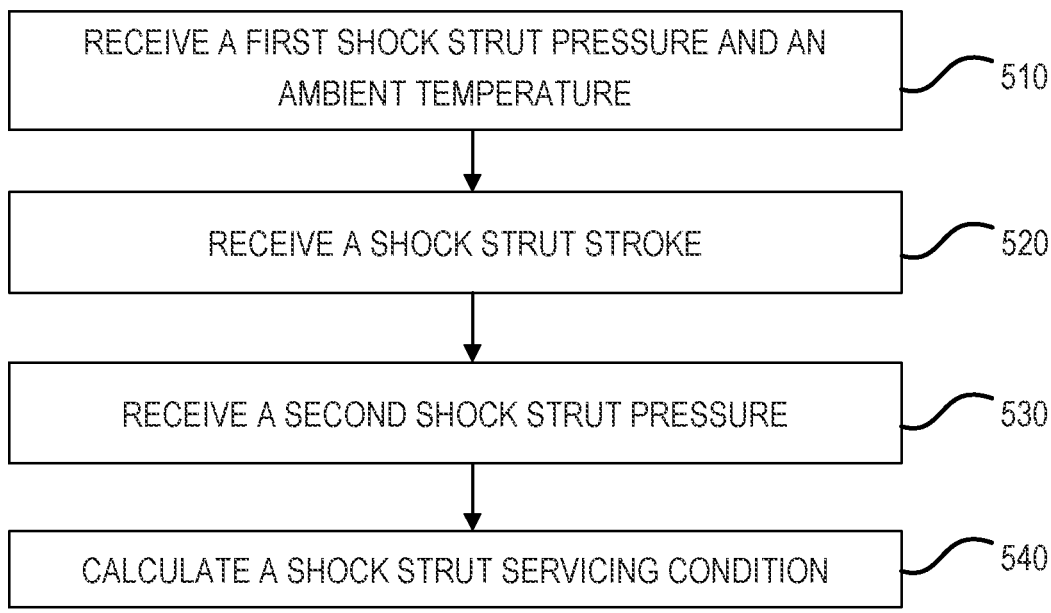

With reference to FIG. 5, a method 500 for monitoring a shock strut is provided, in accordance with various embodiments. Method 500 includes receiving a first shock strut pressure and an ambient temperature (step 510). Method 500 includes receiving a shock strut stroke (step 520). Method 500 includes receiving a second shock strut pressure (step 530). Method 500 includes calculating a shock strut servicing condition (step 540).

With combined reference to FIG. 1, FIG. 2, FIG. 3, and FIG. 5, step 510 may include receiving, by controller 25, first shock strut pressure ($\hat{P}^b$) and ambient temperature ($\hat{T}^b$) (step 510). Controller 25 may receive first shock strut pressure ($\hat{P}^b$) from pressure sensor 150. Controller 25 may receive ambient temperature ($\hat{T}^b$) from temperature sensor 50A, temperature sensor 50B, or temperature sensor 50C. Step 520 may include receiving, by controller 25, shock strut stroke ($\hat{S}^b$). In various embodiments, a technician may enter shock strut stroke ($\hat{S}^b$) into an input device, such as a keyboard for example, to controller 25. Shock strut stroke ($\hat{S}^b$) may be measured manually, for example using a measuring device such as a ruler or tape measure. However, it is contemplated herein that in various embodiments shock strut stroke ($\hat{S}^b$) may be measured automatically, such as via a position sensor for example. Step 530 may include receiving, by controller 25, second shock strut pressure ($\hat{P}^a$) from pressure sensor 150. In various embodiments, it may be assumed that the second shock strut pressure ($\hat{P}^a$) corresponds to a shock strut stroke of zero (i.e., when the shock strut is fully extended). In various embodiments, it may be assumed that the second shock strut pressure ($\hat{P}^a$) corresponds to a known, pre-determined shock strut stroke (e.g., the shock strut may be shrunk to a pre-determined shock strut stroke prior to being stored in the landing gear bay). Second shock strut temperature ($\hat{T}^a$) may be assumed to be equal to ambient temperature ($\hat{T}^b$). Second shock strut temperature ($\hat{T}^a$) may be a measured value. Step 540 may include calculating, by controller 25, a shock strut servicing condition using equations 1 through equation 6 as disclosed herein.

In various embodiments, the servicing condition of shock strut 100 may be sent to a display after being calculated. For example, with momentary reference to FIG. 1, the servicing condition of shock strut 100 may be sent, by controller 25, to a display and a technician may service shock strut 100 based upon the servicing condition. For example, the servicing condition may indicate that the shock strut is properly serviced, over serviced, or under serviced with oil and/or gas.

Figure 6:
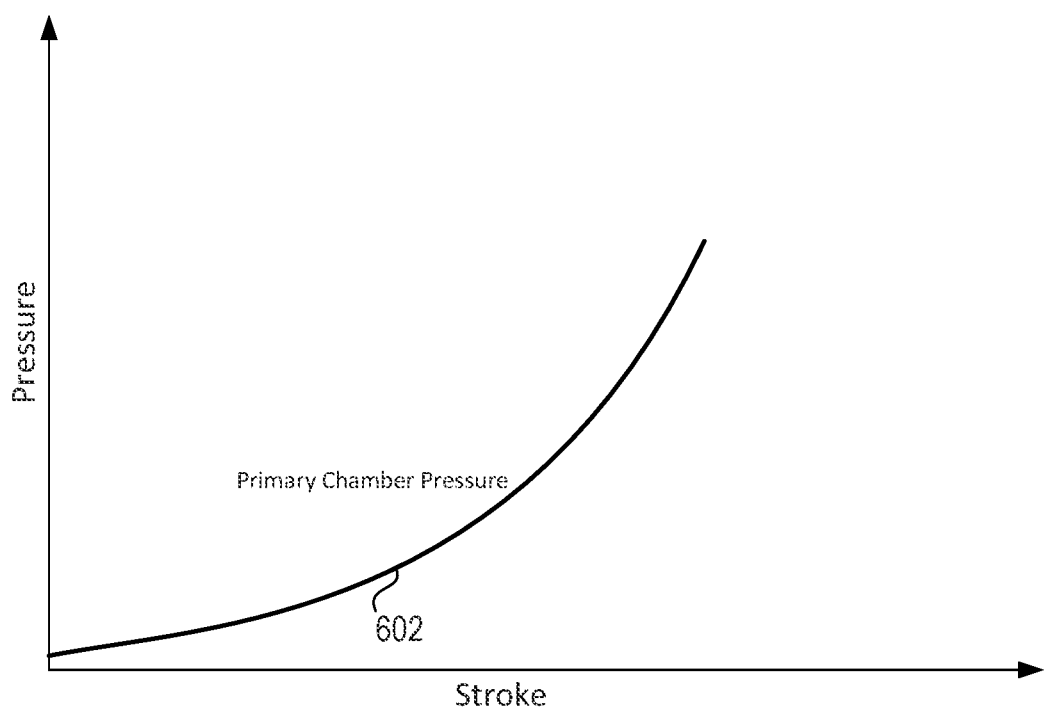
FIG. 6 illustrates a reference curve for determining a servicing condition of the shock strut, in accordance with various embodiments.

In addition to determining the servicing condition of shock strut 100 based upon solving a set of equations, it is further contemplated that the servicing condition may be determined using a reference curve. With reference to FIG. 6, the servicing condition may be determined by comparing the measured temperature and pressure values (e.g., as measured in step 410, step 420, and step 440 of FIG. 4) with a reference curve 602. Reference curve 602 may correspond to the measured ambient temperature. Pressure values which are equal to the reference curve 602 at a given stroke may indicate a properly serviced shock strut, whereas pressure values which are different from the reference curve 602 at a given stroke may indicate that the shock strut servicing is desired.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for monitoring a shock strut of an aircraft, comprising:
    measuring a first shock strut pressure;
    measuring an ambient temperature;
    measuring a shock strut stroke;
    measuring a second shock strut pressure;
    determining a servicing condition of the shock strut based upon the first shock strut pressure, the ambient temperature, the shock strut stroke, and the second shock strut pressure; and
    servicing the shock strut with at least one of a liquid and a gas based on a determination of a reference curve corresponding to the ambient temperature,
    wherein
    the first shock strut pressure and the shock strut stroke are measured before a takeoff event, and the second shock strut pressure is measured after the takeoff event.

2. The method of claim 1, wherein the servicing condition is determined further based upon a second shock strut temperature, wherein the second shock strut temperature is assumed to be equal to the ambient temperature.

3. The method of claim 1, wherein the first shock strut pressure and the shock strut stroke are measured before the takeoff event with a weight of an aircraft supported by the shock strut.

4. The method of claim 1, wherein:
    the ambient temperature is measured under a weight on wheels (WONW) condition before the takeoff event;
    the first strut pressure is measured under the WONW condition;
    the shock strut stroke is measured under the WONW condition; and
    the second strut pressure is measured under a weight off wheels (WOFFW) condition after the takeoff event.

5. The method of claim 1, wherein:
    the first strut pressure is measured under a weight on wheels (WONW) condition before the takeoff event;
    the shock strut stroke is measured under the WONW condition;
    the ambient temperature is measured under a weight off wheels (WOFFW) condition after the takeoff event; and
    the second strut pressure is measured under the WOFFW condition.

6. The method of claim 1, wherein the ambient temperature is measured using a temperature sensor located externally from the shock strut.

7. The method of claim 6, wherein the temperature sensor is mounted to at least one of a wing, a fuselage, or a landing gear bay of the aircraft.

* * * * *